March 29, 1949.   H. M. ROBINSON   2,465,930
BUSHING MOUNTING FOR ROTARY PUMPS
Filed Jan. 12, 1946
2 Sheets-Sheet 1

Inventor
Horace Milton Robinson
By *Elwin C. Andrus*
Attorney

March 29, 1949.  H. M. ROBINSON  2,465,930
BUSHING MOUNTING FOR ROTARY PUMPS
Filed Jan. 12, 1946  2 Sheets-Sheet 2
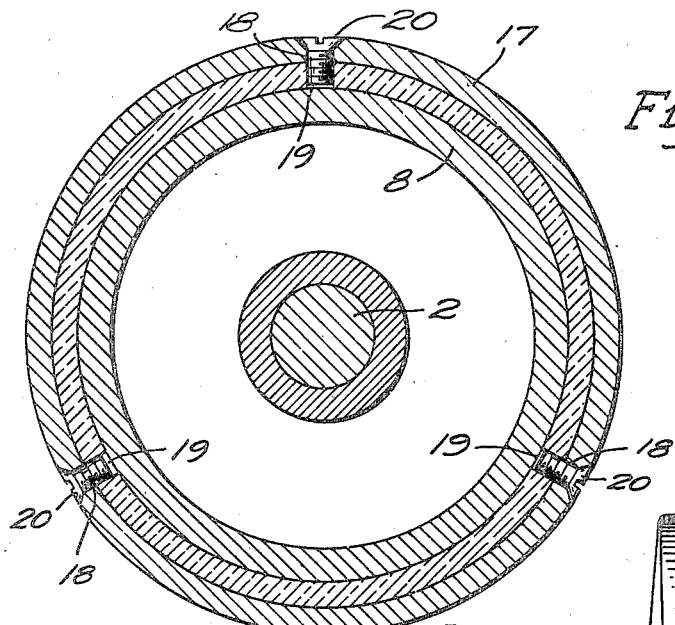
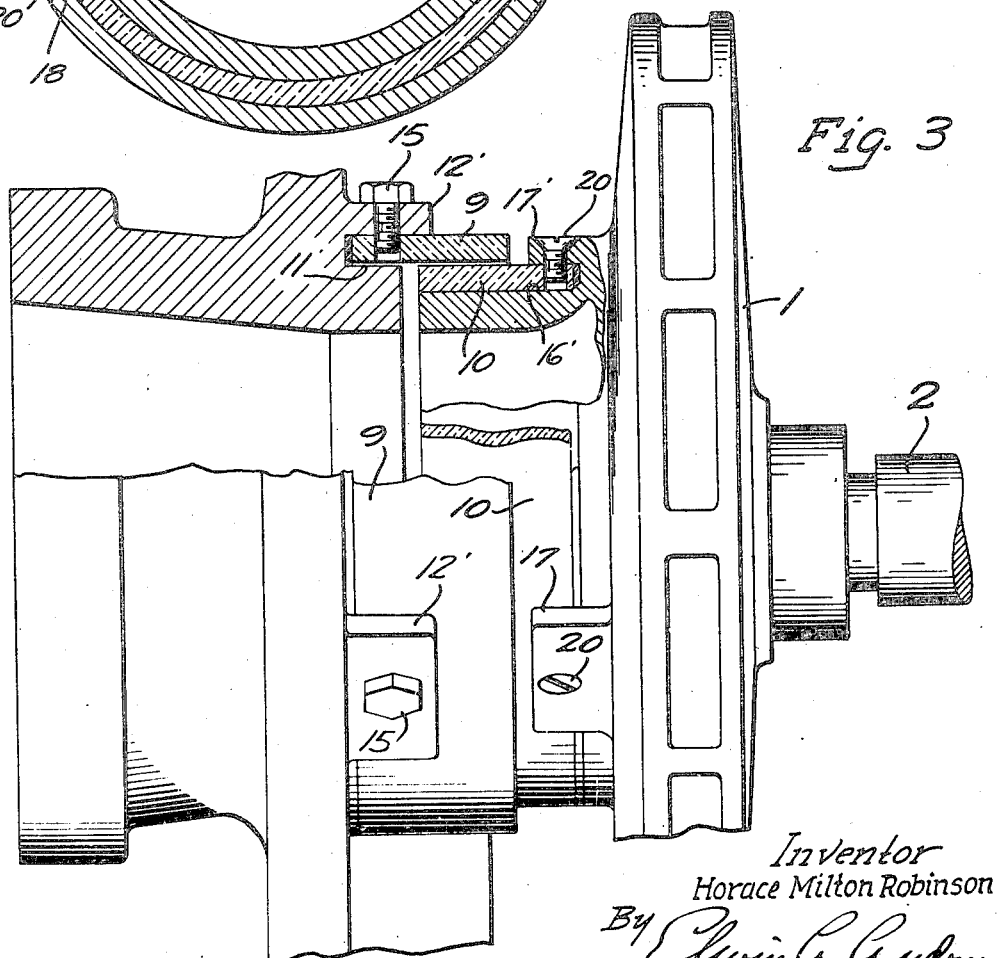
Inventor
Horace Milton Robinson
By
Attorney Patented Mar. 29, 1949

2,465,930

UNITED STATES PATENT OFFICE 2,465,930

BUSHING MOUNTING FOR ROTARY PUMPS

Horace Milton Robinson, Los Angeles, Calif., assignor to A. O. Smith Corporation, Milwaukee, Wis., a corporation of New York Application January 12, 1946, Serial No. 640,823

3 Claims. (Cl. 103—111)

This invention relates to a bushing mounting for rotary pumps and has been applied specifically to the mounting of wear rings in centrifugal pumps.

One of the principal objects of the invention is to provide a mounting for wear rings and the like wherein the wear ring may be readily replaced without injury to the member upon which it is mounted.

Another object of the invention is to provide a mounting for wear rings which does not require costly rings and in which the screws or pins employed for securing the ring are disposed radially and are tight in the wear ring as distinguished from the base so that any corrosion of the screws or pins will not effect injury to the base upon removal.

Another object is to eliminate the necessity of boring and tapping new holes in the base when replacing wear rings and the like.

Other objects and advantages will appear in the following description of an embodiment of the invention illustrated in the accompanying drawings.

In the drawings:

Fig. 2 is a transverse section taken on line 2—2 of Fig. 1; and

Fig. 3 is a broken section through the pump case showing the wear rings partially in elevation and partially broken away and sectioned, illustrating a modified embodiment of the invention.

Figure 1:
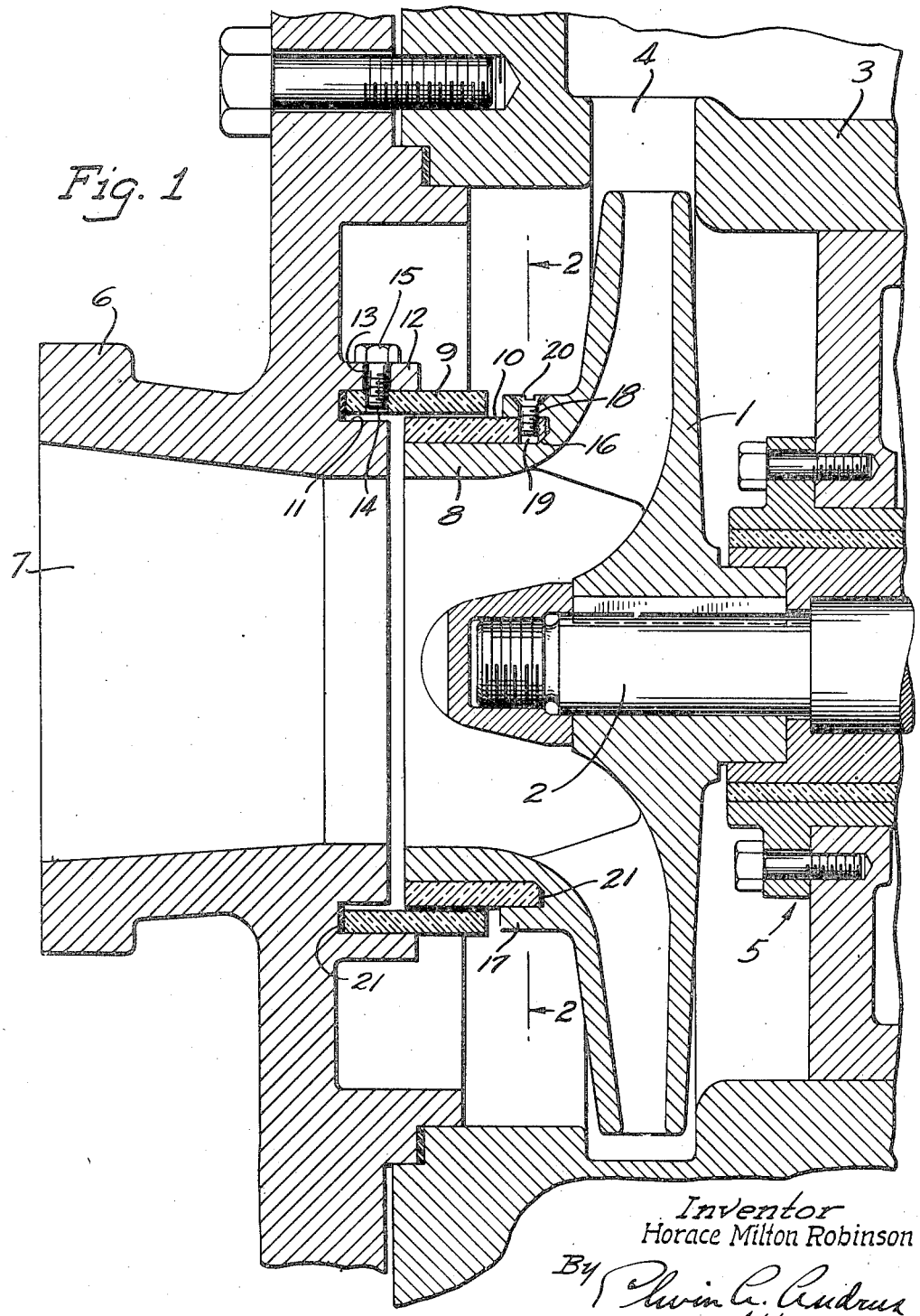
Figure 1 is an axial section through a part of a centrifugal pump showing an impeller, a case and the wear rings therefor.

The pump illustrated has a rotary impeller 1 secured on the forward end of the drive shaft 2, and a case 3 having a volute 4 for receiving pumped fluid and a forward journal 5 for the shaft 2. An inlet nozzle 6 is secured to the case 3 and constitutes a part of the same for enclosing the impeller and providing an axial fluid inlet passage 7 thereto.

In the pumping of liquids of various viscosity it is desired to prevent the return of pumped liquid from the volute 4 to the inlet 7 by passage of the liquid between inlet nozzle 6 and the front shroud 8 of the impeller. For this purpose wear rings 9 and 10 are mounted between the nozzle 6 and shroud 8 to seal the same against passage of fluid therebetween.

Wear ring 9 is secured to the stationary nozzle 6 and wear ring 10 is secured to the rotary shroud 8 and the wear rings are concentrically mounted with ring 10 inside ring 9 and only slightly spaced radially therefrom. The clearance between the wear rings should be kept at a minimum of a very few thousandths of an inch in order to effectively prevent the passage of fluid therebetween.

The overlapping wear rings 9 and 10 are cylindrical and may be formed of tubular stock or flat strip metal. The adjacent surfaces of the rings may be coated with "Stellite" or other suitable hard wear resistant metal.

In mounting wear ring 9 inside nozzle 6, a circular groove or recess 11 is first machined in the inner face of the case to provide a circumferential lip 12. Holes 13 are drilled radially through lip 12 in circumferentially spaced relation.

Ring 9 is provided with tapped holes 14 corresponding to holes 13 in lip 12 so that when ring 9 is fitted into groove 11 lag screws 15 may be inserted through holes 13 and threaded into the ring to secure the latter in place.

In mounting wear ring 10 on impeller shroud 8, a circular groove or recess 16 is first machined in the front face of the shroud to provide a circumferential lip 17. Holes 18 are drilled radially through lip 17 in circumferentially spaced relation.

Ring 10 is provided with tapped holes 19 corresponding to holes 18 in lip 17 so that when ring 10 is fitted into groove 16 screws 20 may be inserted through holes 18 and threaded into the ring to secure the latter in place.

In some instances it is advisable to employ a soft rubber or non-corrosive packing ring 21 at the bottom of grooves 11 and 16 to seal the back side of the corresponding wear rings in case the latter are loose in the grooves.

The screws 15 and 20 provide a means for accurately adjusting and centering the wear rings relative to each other and to the center of shaft rotation. It is possible to obtain accurate centering of the wear rings in the grooves by other means such as a taper fit or the like. In the latter case taper pins may be substituted for the screws 15 and 20.

In the modification shown in Fig. 3 the lips 12 and 17 are not continuous around the circumference, but are in the form of lugs 12' and 17', respectively, which are cast integral with the corresponding base member; i. e., the nozzle 6 and shroud 8 and provide recesses 11' and 16' for receiving the respective wear rings. The screws 15 and 20 pass through the corresponding lugs 12' and 17' and are threaded into the wear rings 9 and 10, respectively.

The number of lugs and screws employed for each wear ring may vary, depending upon the size of the pump. Three screws are preferable where the screws are employed to center the wear rings.

Removal and replacement of wear rings is facilitated by the invention. In the event the screws 15 and 20 become corroded in service and break off in attempting to remove them, they can be drilled out without injury to the lips 12 and 17, leaving the holes 13 and 18 free for insertion of new screws when new wear rings are assembled in place.

The invention not only is applicable to wear rings and bearings for pumps but may be employed in attaching bearing bushings and journals such as might be used with any rotating shaft.

The invention may have various embodiments within the scope of the accompanying claims.

I claim:

1. In a rotary pump, a rotary impeller having a front shroud, a cylindrical wear ring, means for sealing the end of said cylindrical wear ring against the face of the shroud, said shroud having a flange-like member overlapping said wear ring axially from said seal, means passing radially through said shroud member and removably secured in said wear ring to hold the latter in place, a cooperating cylindrical wear ring concentric to said first-named wear ring and in overlapping relation therto, a casing defining an axial inlet and a circumferential outlet for said impeller, means for sealing the free end of said second-named wear ring against said casing, said casing having a flange-like member overlapping said second named wear ring axially from said seal, and means passing radially through said casing member and removably secured in said wear ring to hold the latter in place, said wear rings having a sealing clearance therebetween to maintain the efficiency of said impeller.

2. In a rotary pump, a pair of cylindrical wear rings disposed in overlapping relation with respect to each other between rotary and stationary members, one end of one wear ring being disposed in a recess in the rotary member and one end of the other wear ring being disposed in a recess in a stationary member, and means extending radially inwardly through said members and threaded into the corresponding wear ring to secure the rings adjustably in place relative to each other and to the center of rotation of the pump.

3. In a rotary pump, a rotary impeller having an outer shroud, a stationary inlet nozzle secured to the impeller end of the pump with the inlet thereof aligned with the shroud of the impeller, a pair of cylindrical wear rings disposed in overlapping relation with respect to each other between the impeller shroud and the stationary member, one end of one wear ring being disposed in a recess in the shroud member and one end of the other wear ring being disposed in a recess in the stationary inlet nozzle member, and means extending radially inwardly through said members and threaded into the corresponding wear ring to secure the rings adjustably in place relative to each other and to the center of rotation of the pump.

H. MILTON ROBINSON.

REFERENCES CITED

The following references are of record in the file of this patent:

UNITED STATES PATENTS

| Number | Name | Date |
| --- | --- | --- |
| 1,006,714 | Bell | Oct. 24, 1911 |
| 1,114,238 | Doble | Oct. 20, 1914 |
| 1,238,731 | Anderson | Sept. 4, 1917 |
| 2,257,507 | Mann | Sept. 30, 1941 |

FOREIGN PATENTS

| Number | Country | Date |
| --- | --- | --- |
| 257,330 | Great Britain | 1926 |
| 270,068 | Italy | 1929 |